No. 731,340.                                              Patented June 16, 1903.

UNITED STATES PATENT OFFICE.

GEORGE CHISM, OF CARROLLTON, ILLINOIS, ASSIGNOR TO THE MEXICAN DISINFECTANT COMPANY, OF CARROLLTON, ILLINOIS.

DISINFECTANT.

SPECIFICATION forming part of Letters Patent No. 731,340, dated June 16, 1903.

Application filed January 29, 1903. Serial No. 141,043. (No specimens.)

*To all whom it may concern:*

Be it known that I, GEORGE CHISM, a citizen of the United States, and a resident of Carrollton, in the county of Greene and State of Illinois, have invented a new and useful Improvement in Disinfectants, of which the following is a specification.

My invention relates to an improvement in disinfectants, deodorizers, and germicides, the objects of which are to provide a compound of this nature which will prove far superior to any heretofore invented or in use and one which will be harmless if taken internally. This compound will prevent the spread of contagious and infectious diseases and can be used in the same manner as those already on the market, as will be more fully set forth hereinafter and particularly pointed out in the claims.

My composition consists of the following ingredients combined generally in the proportions and in the manner stated: unslaked lime, one barrel; extract of boneset, two gallons; copperas, twenty-five pounds; Spanish brown, twenty pounds; drab mineral, thirty pounds; crude carbolic acid, one-half gallon; water, from six to nine buckets. These ingredients are commingled and the compound prepared as follows: One barrel of unslaked lime is poured into a galvanized-iron vat of suitable size and provided with a cover which should make the vat air-tight. Onto the lime are poured three buckets of water and the cover placed upon the vat. Let the mixture stand until the thermometer attached to the vat registers about 150° Fahrenheit, the heat being generated by the mixture of water and unslaked lime. I now uncover the vat and add three buckets of cold water together with about three gallons of copperas water prepared by dissolving twenty-five pounds of copperas in three gallons of boiling water, the copperas and boiling water being well stirred in order to facilitate the dissolution of the copperas. After the addition of the dissolved copperas to the solution in the vat I stir the mixture rapidly for about five minutes, then cover the vat, and allow the compound to stand until partially cool. Meanwhile I take all the root, leaves, and stalk of a plant or herb called "boneset" that can be crowded into a vessel of suitable size and adding water thereto boil the infusion until all of the substance or strength of the material has been drawn or extracted from the plant. I then take about two gallons of the extract of boneset and place it in a separate vessel over a fire together with about half a gallon of carbolic acid, allowing the liquid to stand therein until the boiling-point is almost reached, whereupon I pour the mixture into the partially-cooled vat containing the compound and stir rapidly until all the ingredients are well commingled. The compound is now allowed to cool off, and while so cooling I sprinkle about thirty pounds of drab mineral and about twenty-five pounds of Spanish brown into the vat and compress or hammer the mass down in any suitable manner, as with a heavy shovel, and allow the contents of the vat to stand uncovered for a suitable length of time. Then I stir or commingle the whole mass until it forms itself into a dry or approximately dry powder, when the compound is complete.

Water may be added at any time during the process of commingling the ingredients from any suitable source whenever it is necessary to increase the heat in the vat generated by the mixture of water and unslaked lime.

This invention possesses both disinfecting and deodorizing qualities and may be used in vaults, water-closets, slaughter-houses, damp cellars, and in sick-rooms. It may also be used by undertakers, or strewn on the body of any dead animal to render the latter inodorous, and it may be used with the same result in slop-barrels, strong-smelling cisterns, or water-tanks. It may be scattered in alley-ways and will destroy disease germs, and it may be taken into the stomach without harmful effect.

I am aware that compounds of a nature similar to mine have been heretofore invented; but I claim that my ingredients are subject to and do chemically change during the process of compounding the mixture and that in none of the compounds heretofore invented is a like chemical change wrought or the characters of the principal ingredients lost or submerged in the minor ingredients with the same desirable effect.

The proportions of the ingredients set forth will admit of but slight variation in accomplishing the satisfactory result now obtained.

I am aware that a patent was issued to Charles F. Bond August 6, 1889, No. 408,454, on a compound consisting of slaked lime, red ocher, carbolic acid, creosote, bichlorid of mercury, salicylic acid, sulfate of iron and water, and I am also aware of a composition comprising copperas, coal-tar, and charcoal, a patent for which was granted to Edgar Granville Xander February 8, 1887, No. 357,259, both relating to compounds designed to attain the same result as that accomplished by my invention; but I am not aware that all of the ingredients of my composition have been used together.

Therefore what I claim as new, and desire to secure by Letters Patent, is—

1. The herein-described composition of matter containing lime, boneset, Spanish brown, carbolic acid and copperas.

2. The herein-described composition of matter containing lime, boneset, Spanish brown, carbolic acid, copperas and drab mineral.

3. The herein-described composition of matter for disinfecting, deodorizing and germicidal purposes containing water, lime, extract of boneset, Spanish brown, carbolic acid, copperas and drab mineral.

4. The herein-described composition of matter for disinfecting, deodorizing and germicidal purposes consisting of the following ingredients in approximately the following proportions, namely, unslaked lime, one barrel; extract of boneset, two gallons; copperas, twenty-five pounds; drab mineral, thirty pounds; crude carbolic acid, one-half gallon; and from six to nine buckets of water.

In testimony whereof I have signed this specification in the presence of two subscribing witnesses.

GEORGE CHISM.

Witnesses:
E. W. CHISM,
W. H. RAINES.